(12) United States Patent
Lippert et al.

(10) Patent No.: US 6,959,545 B2
(45) Date of Patent: Nov. 1, 2005

(54) ENGINE CONTROL BASED ON FLOW RATE AND PRESSURE FOR HYDRAULIC HYBRID VEHICLE

(75) Inventors: Robert Lippert, Ann Arbor, MI (US); Don Wilbur, Jr., Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 10/768,866

(22) Filed: Feb. 1, 2004

(65) Prior Publication Data

US 2005/0166586 A1    Aug. 4, 2005

(51) Int. Cl.⁷ .......................... F16D 31/02; F04B 49/08
(52) U.S. Cl. .......................... 60/430; 417/34; 417/364
(58) Field of Search .......................... 60/428, 430, 431; 417/34, 364

(56) References Cited

U.S. PATENT DOCUMENTS

| | | | |
|---|---|---|---|
| 2,473,204 A | * | 6/1949 | Huber .......................... 417/340 |
| 3,016,689 A | * | 1/1962 | Bayer et al. .................. 60/595 |
| 4,326,380 A | * | 4/1982 | Rittmaster et al. ............. 60/431 |
| 4,382,748 A | * | 5/1983 | Vanderlaan .................. 417/314 |
| 4,435,133 A | * | 3/1984 | Meulendyk .................. 417/364 |
| 4,589,380 A | * | 5/1986 | Coad ............................ 417/11 |
| 4,791,786 A | * | 12/1988 | Stuyvenberg ................ 60/595 |

* cited by examiner

Primary Examiner—Edward K. Look
Assistant Examiner—Michael Leslie
(74) Attorney, Agent, or Firm—David B. Kelley; MacMillan, Sobanski & Todd

(57) ABSTRACT

A system for a hydraulically driven vehicle includes an engine having multiple, selectively operating cylinder-pump banks producing fluid flow at an outlet, a pump/motor having a variable flow rate including an inlet for driving the wheels, a hydraulic line having a line pressure and connecting the outlet and the inlet, sensors producing signal representing line pressure, pump/motor speed, pump/motor displacement, and a controller for determining a target hydraulic system parameter, determining, based at least in part on the flow rate of the pump/motor and a flow rate produced by each engine cylinder bank, a number of operating cylinder-pump banks that is required to produce the target hydraulic system parameter, and in response to determining the required number of operating cylinder-pump banks, adjusting an engine operating parameter of a cylinder-pump bank such that the required number of cylinder-pump banks operate.

18 Claims, 3 Drawing Sheets

ENGINE CONTROL BASED ON FLOW RATE AND PRESSURE FOR HYDRAULIC HYBRID VEHICLE

BACKGROUND OF THE INVENTION

This invention relates to hybrid motor vehicles having several power sources including an internal combustion engine and hydraulic pressure. More particularly, the invention pertains to the control of the engine and line pressure for such vehicles.

A hydraulic hybrid powertrain consisting of a number of free piston engine-pump banks, an accumulator containing hydraulic fluid at relatively high pressure, and pump/motors located at each axle for driving the wheels.

In such a system, there is a mismatch in operating efficiency of the free piston engine-pump and the efficiency of the pump/motors. The assembly that includes a free piston engine driving a hydraulic pump has a higher efficiency at higher pressures. The pump/motors have higher efficiencies at lower pressures. There is an optimum efficiency point where the combined efficiencies of these components produce overall vehicle efficiency. The flow rate produced by the engine is directly proportional to the number of operating cylinders and the engine speed. The power output by the engine is closely related to line pressure. Therefore, to insure optimum fuel economy, a target line pressure is desired at or near this optimum system efficiency point.

In such a system, there is also control activity called "line pressure cycling," which is characterized by repetitively rising and falling line pressure. This cycling is a result of the inability to match the power input of the engine with the power output of the driving pump/motors.

Line pressure cycling is caused by two factors. If the minimum power generated by the free piston engine is greater than that currently required by the vehicle, the number of operating engine cylinders must be changed repetitively to maintain target pressure. For example, in a typical vehicle driving cycle, the engine may be on only 25% of the time. Regenerative braking, a technique used to recover kinetic energy of the vehicle during wheel braking, also causes hydraulic line pressure cycling. The recovered kinetic energy is stored in a hydraulic fluid accumulator, connected hydraulically to line. This source of energy increases line pressure when the energy is being recovered, but use of the recovered, stored energy causes a decrease in line pressure. These two factors ensure that there will be cycling around a desired target line pressure.

Therefore, any hydraulic hybrid vehicle controls system that is optimized for fuel economy, must allow cycling, and should cause the average system pressure to approach an optimal target pressure. The control system of this invention produces this result by turning on one or more of the free piston engine-pump banks as required to meet the target line pressure.

SUMMARY OF THE INVENTION

A system according to this invention controls pressure to a target pressure by deciding when to turn on and off the engine by using system fluid flow rate requirements as a basis for pressure control. The control the flow rate requirements with reference to three flow devices. The primary flow is the flow use by the pump/motors. A second flow produced by the engine-pump assemblies restores target pressure within a given time period. This time period defines a flow rate or gain. The higher this gain, the closer the pressure levels are to target pressure, thus increasing fuel economy. There is a limit to this gain caused by the cost of starting the engine. Also, increasing the target gain will increase cycling activity, and customers may perceive cycling as noise vibration or harshness. The final source of flow is the accumulator storage limits. If the accumulator pressure approaches the minimum operating pressure, the flow requirement is added to insure pressures above the allowable minimum. If the accumulator pressure is close to the maximum pressure, flow is subtracted to insure that overpressure of the system is avoided.

These hydraulic flow requirements are summed and the resulting signal is used as an input to a deadband controller associated with a particular cylinder bank of the free piston engine. If the summed flow is greater than the flow rate that can be produced by one engine bank, then a first engine bank is started. If this flow requirement drops below zero, then the engine bank is stopped. A second engine bank is started when more than one bank of flow is required to meet target pressure. The second bank is stopped when less than two banks are required. Each engine bank deadband controller uses hysteresis, which turns on and off that bank based on the flow capabilities of that engine bank.

Another control strategy according to this invention involves changing the target pressure requirement and pressure limits after the deadband controller has produced an output representing the number of engine banks required to meet the flow rate required by the pump/motors. The control adds and subtracts banks based on a target range. This requires range thresholds. This control arrangement causes line pressure to rise until the limit is reached, then an engine bank is turned off and line pressure falls until it hits the lower range limit.

An advantage of this invention is defining both an explicit cycling range control and an implicit cycling range control in which target pressure is implicit and need not be defined, although its definition may be desired to optimize fuel economy.

In a hydraulic system that including an engine having multiple cylinder-pump banks that supply fluid through a hydraulic line connected to a pump/motor having a variable flow rate, a method according to this invention for controlling line pressure in the hydraulic system includes the steps of determining a target hydraulic system parameter; determining, based at least in part on the flow rate of the pump/motor and a flow rate produced by each engine cylinder bank, a number of operating cylinder-pump banks that is required to produce the target hydraulic system parameter; and adjusting an engine operating parameter of a cylinder-pump bank such that the required number of cylinder-pump banks operate.

The invention comprehends also a system for transmitting power to the wheels of a vehicle. A system according to this invention includes an engine having an engine operating parameter, including multiple, selectively operating cylinder-pump banks for producing fluid flow at an outlet, a pump/motor having a variable flow rate including an inlet, for driving the wheels a hydraulic line having a line pressure, connecting the outlet and the inlet, and a controller determining a target hydraulic system parameter, determining, based at least in part on the flow rate of the pump/motor and a flow rate produced by each engine cylinder bank, a number of operating cylinder-pump banks that is required to produce the target hydraulic system parameter, and in response to determining the required number of operating cylinder-pump banks, adjusting an engine operating parameter of a cylinder-pump bank such that the required number of cylinder-pump banks operate.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
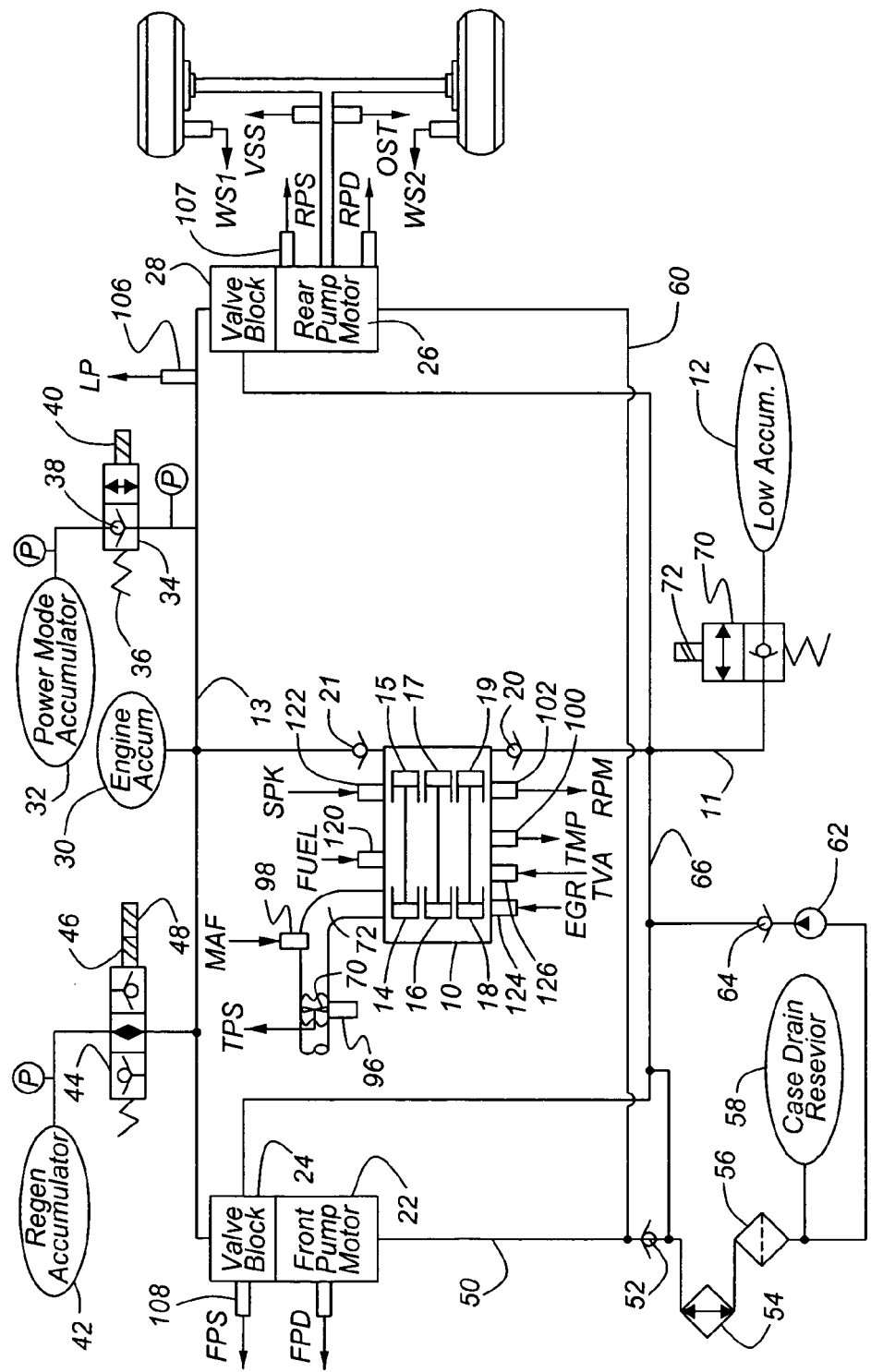
FIGS. 1 and 1A together are a schematic diagram of a hybrid hydraulic system to which the control of the present invention can be applied.
Figure 1A:
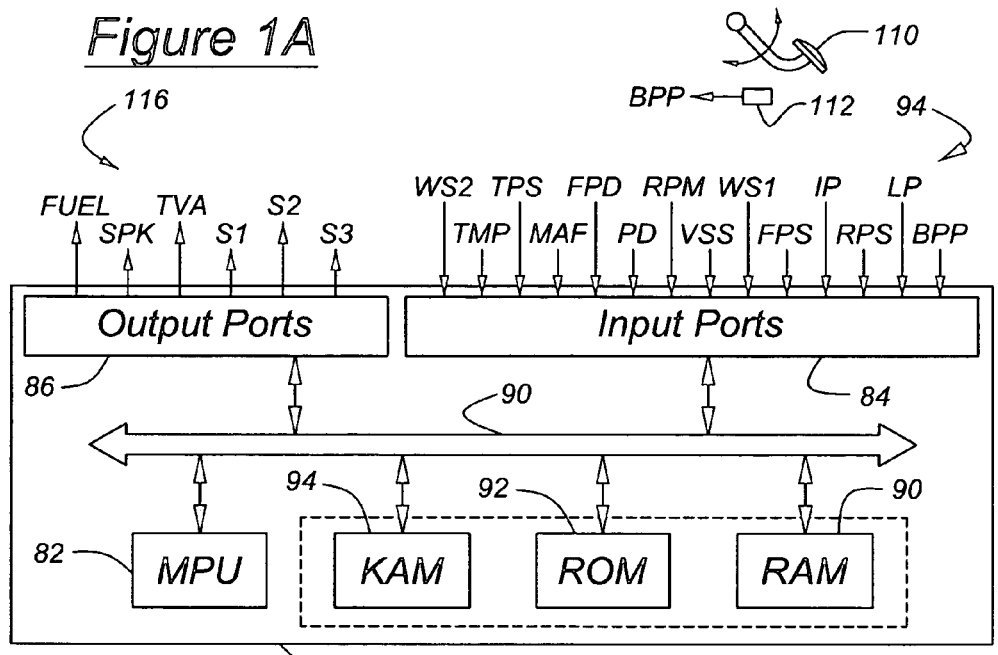

Referring now to the system illustrated in FIG. 1, a free piston 10 pumps hydraulic fluid from a low pressure line 11, hydraulically connected to a low-pressure accumulator 12, to a high pressure line or rail 13. The engine 10 is divided into multiple banks of cylinders 14, 16. 18, each cylinder driveably connected to a hydraulic pump 15, 17, 19. Check valves 20 are located in the fluid path between low-pressure line 11 and inlet of each pump 15, 17, 19. Check valves 21 are located in the fluid path between high pressure line 13 and outlet of each pump. High pressure rail 13 is connected to a front pump/motor 22 and a rear pump/motor 26 so that they are supplied with pressure at substantially the same magnitude. The flow produced by engine 10 is directly proportional to the number of cylinders and the engine speed. Therefore, power output by the engine is closely related to line pressure, the pressure in rail 13.

A front hydraulic pump motor 22 is supplied with relatively high pressure fluid through a valve body 24, connected to high pressure line 13. Pump/motor 22 is driveably connected to the front wheels of a motor vehicle. Similarly, the rear hydraulic pump/motor 26 is supplied with high pressure hydraulic fluid through a valve body 28, connected to high pressure rail 13. The rear wheels of the motor vehicle are driven in rotation by pump/motor 26. The front and rear pump/motors 22, 26 are variable displacement hydraulic pumps, each pump having a maximum displacement or volumetric flow rate.

When an increase of power must be delivered to the front wheels and rear wheels through the pump/motors 22, 26 while the pumps are operating at maximum displacement, the pressure supply to the pump motors must be increased in order to increase the output power from the pump/motors. During normal operation the pump/motors 22, 26 generate torque by fluid flow from high pressure rail 13 to low pressure line 11. When the wheel brakes are braking the vehicle, the direction of torque and direction of fluid flow are reversed. Disregarding losses, torque is proportional to the product of displacement and pressure difference. Flow rate is proportional to the product of speed and displacement.

The hydraulic fluid outlet side of the engine 10, through which rail 13 is supplied, is connected to an engine accumulator 30, which buffers or attenuates hydraulic pressure pulses produced by variations in engine speed and its inertia. A high pressure or power mode accumulator 32 communicates with rail 13 through a valve 34. A spring 36 biases the valve 34 to the position shown in FIG. 1, where check valve 38 opens and closes the hydraulic connection between accumulator 32 and rail 13 depending on that pressure differential across valve 34. When actuated, solenoid 40 overcomes the effect of spring 36 and moves the valve to a second state where a connection between accumulator 32 and rail 13 is open through the valve.

A brake regeneration accumulator 42 stores energy recovered during the process of braking the drive wheels of the motor vehicle and stores that energy in the form of relatively high pressure hydraulic fluid. Accumulator 42 is connected to and disconnected from line pressure in rail 13 through a valve 44 in accordance with the state of two control solenoids 46, 48.

The outlet side of the front pump/motor 22 is connected through line 50 and check valve 52 to a heat exchanger 54, filter 56 and a case drain reservoir 58. Similarly, the outlet side of the rear hydraulic pump/motor 26 is connected through line 60 to the case drain reservoir 58. A recovery pump 62 draws hydraulic fluid from the reservoir 58 and supplies fluid to the system through a check valve 64 and line 66. Line 66 mutually connects the valve blocks 24, 28, and accumulator 12 is connected to line 66, through which the inlet side of the hydraulic pumps 15, 17, 19 are supplied.

A controller 80, preferably a microprocessor-based controller, provides integrated control of the engine 10 and the hydraulic system. The present invention may be implemented with a separate engine or system controller depending upon the particular application. Controller 80 includes a microprocessor 82 in communication with input ports 84, output ports 86, and computer readable media 88 via a data/control bus 90. Computer readable media 88 may include various types of volatile and nonvolatile memory such as random access memory (RAM) 90, read-only memory (ROM) 92, and keep-alive memory (KAM) 94. These functional descriptions of the various types of volatile and nonvolatile storage may be implemented by any of a number of known physical devices including, but not limited to PROMs, EPROMs, EEPROMs, flash memory, and the like. Computer readable media 88 include stored data representing instructions executable by microprocessor 82 to implement the method for controlling selective operation of the bank of engine cylinders 14, 16, 18 and pumps 15, 17, 19, and the solenoids 40, 46, 48, 72 that change the state of the valves 34, 44, 70 in accordance with commands produced as a result of repetitive execution of control algorithms stored in electronic memory 92 on computer readable media 88.

A plurality of sensors, indicated generally by reference numeral 94, in communication with corresponding input ports 84 of controller 80, sense or monitor the current operating and ambient conditions of the engine, hydraulic system, and vehicle. The engine parameter sensors preferably include a throttle valve position sensor (TPS) 96, which monitors; the position of throttle valve, disposed within the engine intake. A mass airflow sensor (MAF) 98 provides an indication of the air mass flowing through the engine intake. A temperature sensor (TMP) 100 provides an indication of the engine coolant temperature, or engine oil temperature. An engine speed sensor (RPM) 102 monitors the speed of engine 10. A rotational speed sensor, vehicle speed sensor (VSS) 104, provides an indication of the speed of the vehicle derived from the speed of the axles, driveshaft, or individual wheels.

The hydraulic system input sensors preferably include a pressure sensor 106, which monitors the magnitude of line pressure in rail 13 (LP). Pump/motor speed sensors 108 provide an indication of the current speed of the front axle and rear axle pump/motors 22, 26, (FPS) and (RPS), respectively. Swashplate angle sensors 107 provide an indication of the current angular position of the swashplates of the front axle and rear axle pump/motors. The corresponding swashplate angular position is proportional to displacement of the front pump/motor (FPD), and displacement of the rear pump/motor (RPD).

A brake pedal 112, controlled by the driver, includes a pedal position sensor 112, which provides an indication of the position of brake pedal (BPP), or the applied and released states of the brake pedal. An accelerator pedal, manipulated by the driver to control the output of the powertrain, includes a pedal position sensor, which provides an indication of the position of accelerator pedal, preferably in the form of counts, with an increasing number of counts indicating a request for increased power output.

Depending upon the particular application requirements, various sensors may be omitted or alternative sensors may be provided that generate signals indicative of related sensed parameters. Values corresponding to ambient or operating conditions may be inferred or calculated using one or more of the sensed parameters without departing from the spirit or scope of the present invention.

In addition to the sensors described above, a plurality of actuators, indicated generally by reference numeral 116, communicate with controller 80 via output ports 86 to effect control of the engine 10, hydraulic system and vehicle in response to commands generated by the controller 80. Actuators 116 may include actuators for timing and metering fuel (FUEL) 120, controlling ignition angle or timing (SPK) 122, setting the amount of exhaust gas recirculation (EGR) 124, and adjusting the intake air using throttle valve with an appropriate servomotor or actuator (TVA) 126.

Figure 2:
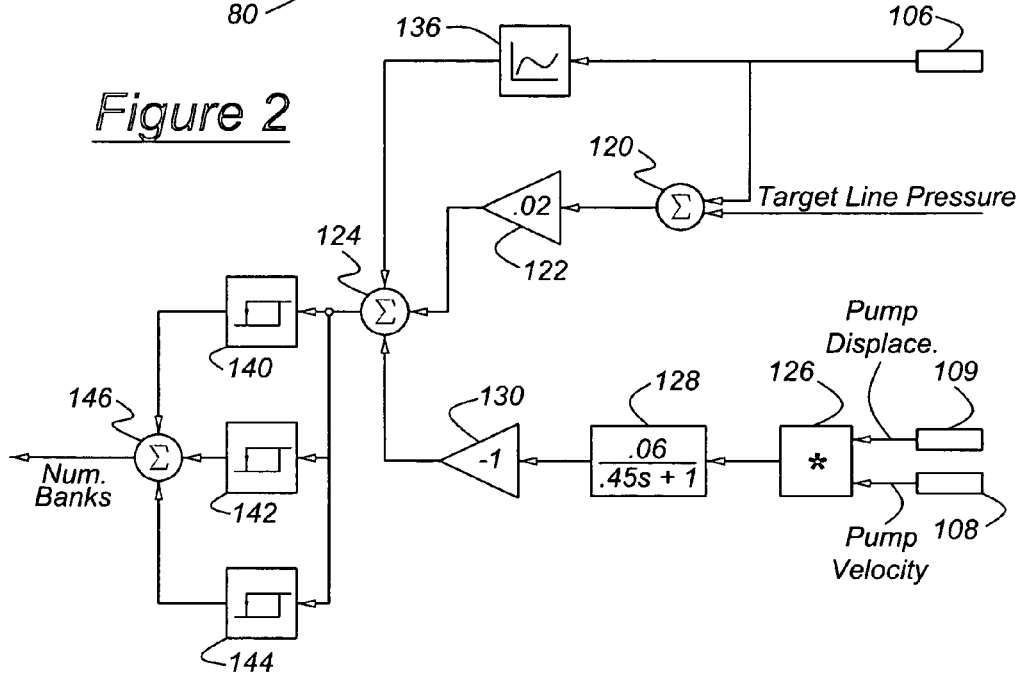
FIG. 2 is an engine bank controller for the hydraulic system of FIGS. 1 and 1A.

Referring now to FIG. 2, the controller 80 includes an algorithm for controlling the number of engine cylinder-hydraulic pump subassemblies (called "banks") are required to meet a target pressure of the hydraulic system. In the hydraulic system of FIG. 1, there is a mismatch in operating efficiency of the engine 10 with that of the pump/motors 22, 26. The engine 10 has a higher efficiency at high pressure in rail 13, but the pump-motors 22, 26 have higher efficiencies at lower pressure in rail 13 due to the use of higher pump/motor displacements. Therefore, there is an optimum efficiency point where the combined efficiencies produce overall system efficiency. To produce optimum fuel economy, a target pressure is desired at or near this optimum system efficiency point.

The controller 80 determines the target pressure. Target pressure is a calibrated magnitude determined by the controller on the basis of current performance parameters and characteristics of the engine 10 and pump/motors 22, 26. These parameters include the flow rate, the operating efficiency at current conditions, the current pressure in rail 13, and volumetric flow rate in rail 13.

Reference to "calibratable" and "calibrated" means a scalar or function whose value is a predetermined magnitude, which can be changed or calibrated in order to produce a desired performance characteristic. Calibrated function values are stored in memory, the current magnitudes of which are determined from a look-up table with reference to another variable or a set of variables, the arguments or indexes of the function.

Signals representing the current magnitude of line pressure in rail 13, the current rotational speed of pump/motors 22, 26, and the current displacements of the pump/motor, produced by sensors 106, 107, 108, are received as input by controller 80.

In a system such as that of FIG. 1, there is a mismatch in operating efficiency of the engine-pump 10 and the efficiency of the pump/motors 22, 26. The engine 10, preferably a free piston engine, which includes banks of engine cylinders and a hydraulic pump driven by each engine cylinder bank, has a higher efficiency at higher line pressures. The pump/motors 22, 26 have higher efficiencies at lower line pressures. There is an optimum efficiency point where the engine-pump and pump/motors in combination produce an overall vehicle efficiency that is optimal. Therefore, to insure optimum fuel economy, a target line pressure is determined at or near this optimum system efficiency point.

In FIG. 2, the current input pressure in rail 13 and the target input pressure determined by the controller are subtracted at summing junction 120 to determine the current line pressure error. A gain is applied at 122 to determine from the pressure error the change in flow rate in supply rail 13 that is required to produce the target line pressure within a given period under current operating conditions. That target flow rate is applied to summing junction 124.

At 126, the commanded pump/motor displacement is multiplied by the current pump/motor speed to determine the current volumetric flow rate of the motor/pumps, the product of the multiplication. A first order, lag filter 228 removes minor, high speed variations or noise in the flow rate calculated by multiplier 126. The average flow rate currently used by the pump/motors 22, 26 is converted by inverter 130 to the flow rate out of the engine 10 necessary to supply the current flow rate of the pump/motors. This value is also applied to summing junction 124.

The controller 80 contains in its memory accessible to the microprocessor 82 values of the maximum line pressure at which some or all of the cylinders or banks of the engine 10 should be turned off and providing no flow to rail 13. The pressure limits of the accumulators and other structural limits of the hydraulic system are factors in establishing the upper line pressure limit. If the pressure in either accumulator 32, 42 is close to a maximum acceptable accumulator pressure, a requirement for reduced flow is subtracted at summing junction 124 to keep line pressure below an allowable maximum pressure.

The controller 80 also has access to values of the minimum line pressure at which some of the cylinder-pump banks of the engine 10 should be turned on to supply flow to the pump/motors. Minimum line pressure limits are set at least in part with reference to the line pressure required to maintain a nitrogen precharge pressure in accumulators 32, 42. If the accumulator precharge pressure approaches a minimum pressure, a requirement for additional flow is added at summing junction 124 to keep line pressure above the allowable minimum pressure.

These maximum and minimum line pressure limits are represented in a function block 136, which produces as an output to junction 124 the relevant maximum and minimum flow rates produced by engine 10 on the basis of current rail pressure, which is supplied as an index to the function 136. These maximum and minimum flow rates are another input to summing junction 124.

The three inputs to summing junction 124 are processed and the controller produces as output from junction 124 the volumetric time rate of flow currently required by the engine 10 to produce the target line pressure within an predetermined, acceptable period, to supply the current flow rate to the pump/motors, and to keep accumulator pressure within an acceptable pressure range.

The required engine output flow rate is supplied to dead band controllers 140, 142, 144, each controller being associated with an individual engine. If the desired flow rate is in a range bounded by the maximum and minimum flow rate producing capacity of the bank represented by cylinder 14, deadband controller 140 issues a command to an engine controller to operate cylinder 14. If the desired engine flow rate exceeds the maximum flow rate producing capacity of the bank represented by cylinder 14, control passes to controller 142.

If the desired engine flow rate is less than the minimum flow rate producing capacity of the bank represented by cylinder 14, the controller issues a command to an engine controller to stop operation of cylinders 14, 16 and 18.

Deadband controller 142 issues a command to the engine controller to operate the engine bank represented by cylinder 16. The controller determines the difference between the desired engine flow rate and the flow rate produced by engine bank 14. If that flow rate difference exceeds the maximum flow rate producing capacity of the bank represented by cylinder 16, control passes to deadband controller 144, which issues a command to the engine controller to operate the engine bank represented by cylinder 18.

Whenever the desired engine flow rate can be produced by less than the all the engine banks, the controller issues a command to the engine controller to stop operation of the number of engine banks that are not required to meet the current desired engine flow rate.

These results are produced by each deadband controller 140, 142, 144 producing either a high or low output. These outputs are summed at summing junction 146 to produce the number of required operating engine banks, the command to which the engine controller responds. The engine controller responds to these commands by changing any or several engine parameters including engine throttle position, ignition timing, engine inlet port timing, and engine air-fuel ratio to produce the engine bank-on and engine bank-off commands of the controller.

Figure 3:
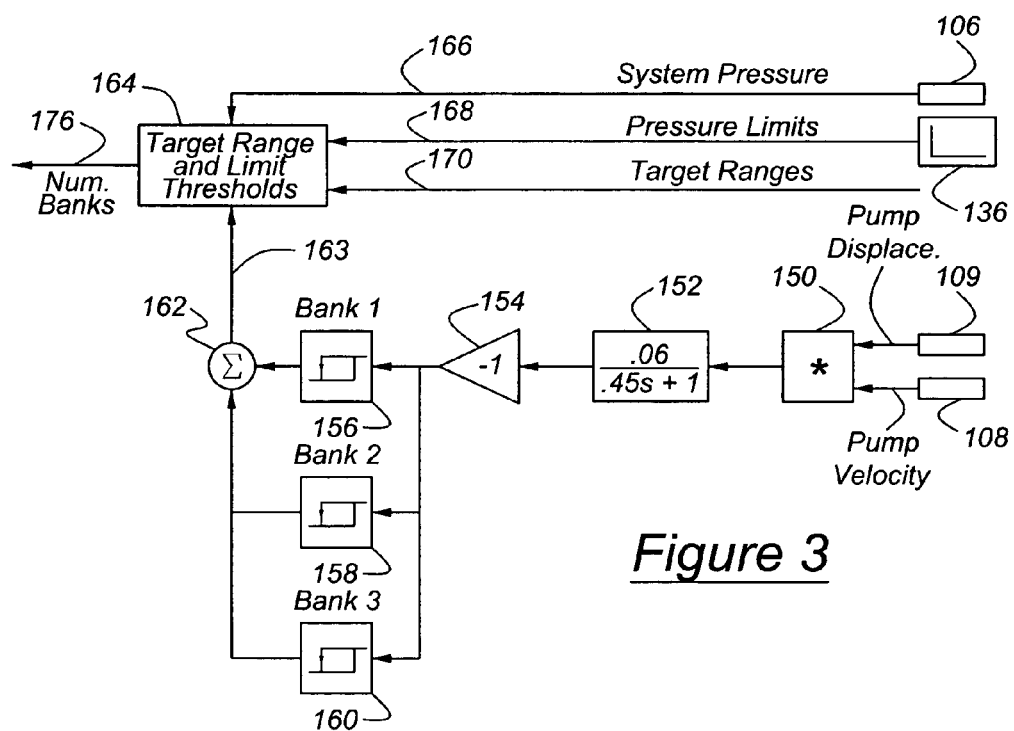
FIG. 3 is an alternate engine bank controller for the hydraulic system of FIGS. 1 and 1A.

An alternate form of the control is set forth in FIG. 3. Signals representing the current magnitude of line pressure in rail 13, the current rotational speed of pump/motors 22, 26, and the current displacements of the pump/motor, produced by sensors 106, 107, 108, are received as input by controller 80. At 150, the commanded pump/motor displacement is multiplied by the current pump/motor speed to produce the current volumetric flow rate of the motor/pumps, the product of the multiplication. A first order, lag filter 152 removes minor, high speed variations or noise in the flow rate produced at multiplier 150. The average flow rate currently used by the pump/motors 22, 26 is converted by inverter 154 to the flow rate out of the engine 10 necessary to provide the current flow rate of the pump/motors. This value is also applied to deadband controllers 156, 158, 160. The high or low outputs of those controllers are summed at junction 162. The number of operating engine banks currently required to produce the flow requirements of motor/pumps 22, 26 is output by junction 162 and supplied as input 163 to a software module 164 containing a look-up function indexed by several variables.

A signal representing the current magnitude of line pressure in rail 13 is an input to the controller as it executes module 164. The controller 80 contains also a maximum line pressure limit at which all of the cylinder banks 14, 16, 18 of engine 10 should be turned off, thereby providing no flow from the pumps 15, 17, 19 to rail 13. Controller 80 also contains values of the minimum line pressure in rail 13 at which all of the cylinders or banks of the engine 10 should be turned on to provide flow from the pumps 15, 17, 19 to the pump/motors through rail 13. These pressure limit magnitudes 168 are accessible to the processor as it executed the control algorithm of module 164.

A third input 170 to module 164 is a predetermined target line pressure. Vehicle driveability and system requirements determine the current target line pressure. For example when vehicle speed is low, the target line pressure is set high. At low vehicle speed, the magnitude of vehicle kinetic energy that can be recovered by brake regeneration techniques and stored in regen accumulator 42 for later release to rail 13 is relatively small. Conversely, when vehicle speed is high, the recoverable vehicle kinetic energy that can be stored in accumulator 42 for later release to rail 13 is relatively large. Therefore, at high vehicle speed, the target line pressure is low.

A lower line pressure target limit is determined by arbitrating between the pressure that results from an energy balance of the accumulator energy storage capability and the magnitude of kinetic energy of the vehicle available for recovery by regenerative braking. The minimum target line pressure is dictated by the line pressure magnitude required to meet accumulator gas precharge requirements, and the pressure required to meet the current road load and to provide an additional margin of power for accelerating the vehicle in response to a demand for more power produced by the vehicle operator's control over the accelerator pedal.

The upper line pressure target limit is determined from 1) a simple pressure offset to provide hysteresis at line pressure switch-points, and 2) the optimum line pressure that will produce optimal system efficiency and current power requirements.

In the case of a simple pressure offset, the range of line pressure that the system experiences is controlled for repeatability. However, the cycling time of the engine will vary depending on the power output by the engine and the power consumption of the pump/motors.

In the case when system efficiency is used to set a target line pressure, the engine efficiency must be combined with the pump/motor efficiency to determine the pressure where the system will be most efficient at the desired power output.

Line pressure will cycle through the discrete line pressure target range, which is bounded by the lower target limit and the upper target limit. When the efficiency is used to help determine the upper pressure limit, a variation in the pressure cycling range will occur.

Line pressure will drop as power is used if the engine is not producing a magnitude of power that is equivalent to, or greater than the power being used by the driveline. When line pressure reaches the lower target limit, a flag is set to indicate to the controller that line pressure must be increased (flg_pres_dir=1). The controller responds to this set flag by causing an additional engine cylinder-pump bank to begin producing power above and beyond the power needed to meet the tractive power request. When line pressure increases to the upper line pressure target limit, the flag is cleared (flg_pres_dir=0), and a cylinder-pump bank is turned off, resulting in a deficit between the power produced by the engine and the power consumed by the driveline. Then line pressure again decreases.

In order to determine the number of cylinder-pump banks that should be operating, the controller divides the driveline power request by the power produced by one cylinder-pump bank. This non-integer number is then rounded down to the nearest integer. This will always produce an engine output power, which is less than the driveline power consumption. The number of cylinder-pump banks so determined is then changed in response to the set and cleared state of flg_pres_dir. The controller causes line pressure to decrease when the flag is cleared and to increase when the flag is set.

The number of engine cylinder-pump banks required to operate is the commanded output 176 produced as a result of executing the control algorithm represented by module 164. The engine controller responds to this command by changing any or several engine parameters including, but not limited to engine throttle position, ignition timing, engine inlet port timing, and engine air-fuel ratio to turn on and to turn off cylinder-pump banks in response to the commands 176 output by the controller 80.

The control algorithms are executed repetitively by the controller 80, commands 176 are repetitively produced as operating conditions change, and the engine controller repetitively responds to the commands by changing engine parameters in order to operate the commanded number of engine cylinder-pump banks.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling line pressure in a hydraulic system including an engine having multiple cylinder-pump banks that supply fluid through a hydraulic line connected to a pump/motor having a variable flow rate, comprising the steps of:
   determining a target hydraulic system parameter;
   determining, based at least in part on the flow rate of the pump/motor and a flow rate produced by each cylinder-pump bank, a number of operating cylinder-pump banks that is required to produce the target hydraulic system parameter; and
   adjusting an engine parameter of a cylinder-pump bank, such that the required number of cylinder-pump banks operate.

2. The method of claim 1, wherein the step of determining a target hydraulic system parameter further comprises:
   determining a current flow rate of the pump/motor;
   determining a flow rate of the engine that would produce a target line pressure within a predetermined period; and
   summing the determined current flow rate of the pump/motor and the determined flow rate of the engine.

3. The method of 2, wherein the step of determining a flow rate of the engine that would produce a target line pressure within a predetermined period further comprises:
   determining a current line pressure;
   determining a target line pressure;
   determining a length of a period in which to change the current line pressure to the target line pressure; and
   determining, based on a difference between the current line pressure and a target line pressure, an engine-pump flow rate that would produce the target line pressure within the length of the determined period.

4. The method of claim 3, wherein the step of determining a target line pressure, further comprises:
   determining a current flow rate of the pump/motor;
   determining a current flow rate of the engine; and
   determining a target line pressure at which the pump/motor and engine in combination operate at optimum efficiency at the current flow rate of the pump/motor and a current flow rate of the engine.

5. The method of claim 1, wherein the hydraulic system includes an accumulator connected to line pressure, and the step of determining a target hydraulic system parameter further comprises:
   determining a current flow rate of the pump/motor;
   determining a flow rate of the engine that would produce a target line pressure within a predetermined period;
   determining a flow rate at which a pressure in the accumulator is within a predetermined range of pressure; and
   summing the determined current flow rate of the pump/motor, the determined flow rate of the engine, and the determining flow rate at which a pressure in the accumulator is within an acceptable range of pressure.

6. The method of 5, wherein the step of determining a flow rate of the engine that would produce a target line pressure within a predetermined period further comprises:
   determining a current line pressure;
   determining a target line pressure;
   determining a length of a period to change the current line pressure to the target line pressure; and
   determining, based on a difference between the current line pressure and a target line pressure, an engine-pump flow rate that would produce the target line pressure within the length of the determined period.

7. The method of claim 6, wherein the step of determining a target line pressure, further comprises:
   determining a current flow rate of the pump/motor;
   determining a current flow rate of the engine; and
   determining a target line pressure at which the pump/motor and engine in combination operate at optimum efficiency at the current flow rate of the pump/motor and a current flow rate of the engine.

8. The method of claim 1, wherein the step of determining a number of operating cylinder-pump banks that is required to produce the target hydraulic system parameter, further comprises the steps of:
   determining a flow rate capacity of each cylinder-pump bank;
   determining a current flow rate of the pump/motor;
   determining a flow rate of the engine that would produce a target line pressure within a predetermined period;
   summing the determined current flow rate of the pump/motor and the determined flow rate of the engine; and
   dividing the flow rate resulting from the step of summing by the flow rate capacity of each cylinder-pump bank.

9. The method of claim 1 wherein the step of adjusting an engine operating parameter of a cylinder-pump bank further comprises a step of the group consisting of:
   adjusting an engine airflow;
   adjusting a throttle position of the engine;
   adjusting an ignition timing; and
   adjusting an engine air-fuel ratio.

10. The method of claim 1, wherein the step of determining a target hydraulic system parameter further comprises:
    determining a maximum and a minimum line pressure based on a current road load, a potential road load on the pump/motor, and a current magnitude of recoverable vehicle kinetic energy; and
    determining a target range of line pressure based on the maximum and minimum determined line pressures.

11. The method of claim 1, wherein:
    the step of determining a target hydraulic system parameter comprises determining a target range of line pressure based on maximum and minimum determined line pressures; and the step of determining a number of operating cylinder-pump banks that is required to produce the target hydraulic system parameter further comprises the steps of:
  determining a flow rate capacity of each cylinder-pump bank;
  determining a current flow rate of the pump/motor;
  determining a flow rate of the engine that would produce a target line pressure within a predetermined period;
  summing the determined current flow rate of the pump/motor and the determined flow rate of the engine; and
  dividing the flow rate resulting from the step of summing by the flow rate capacity of each cylinder-pump bank.

12. A system for transmitting power to the wheels of a vehicle comprising:
  an engine having an engine operating parameter, including multiple, selectively operating cylinder-pump banks for producing fluid flow at an outlet;
  a pump/motor having a variable flow rate including an inlet, for driving the wheels;
  a hydraulic line having a line pressure, connecting the outlet and the inlet; and
  means for determining a target hydraulic system parameter, means for determining, based at least in part on the flow rate of the pump/motor and a flow rate produced by each engine cylinder bank, a number of operating cylinder-pump banks that is required to produce the target hydraulic system parameter, and in response to determining the required number of operating cylinder-pump banks, means for adjusting an engine operating parameter of a cylinder-pump bank such that the required number of cylinder-pump banks operate.

13. The system of claim 12, further comprises means for determining a current flow rate of the pump/motor, means for determining a flow rate of the engine that would produce a target line pressure within a predetermined period; and means for summing the determined current flow rate of the pump/motor and the determined flow rate of the engine.

14. The system of claim 13, further comprises:
  a dead-band controller associated with each cylinder-pump bank for determining, based on the sum of the determined current flow rate of the pump/motor and the determined flow rate of the engine and the flow rate produced by each engine cylinder bank, whether each respective cylinder-pump bank is required to operate.

15. The system of claim 13, further comprises:
  a dead-band controller associated with each cylinder-pump bank for determining, based on the sum of the determined current flow rate of the pump/motor, the determined flow rate of the engine, and the determined flow rate at which a pressure in an accumulator is within a predetemined range of pressure and the flow rate produced by each engine cylinder bank, whether each respective cylinder-pump bank is required to operate.

16. The system of claim 12, wherein the system further comprises:
  a first sensor producing a signal output to representing a current line pressure; and
  means for determining a target line pressure and a length of a period to change the current line pressure to the target line pressure, and means for determining, based on a difference between the current line pressure and a target line pressure, an engine-pump flow rate that would produce the target line pressure within the length of the determined period.

17. The system of claim 12, wherein the system further comprises:
  an accumulator connected to the hydraulic line;
  a first sensor producing a signal representing a current line pressure determining current flow rate of the pump/motor;
  a second sensor producing a signal representing a current displacement of the pump/motor; and
  means for calculating from the signals produced by the first sensor and second sensor a current flow rate of the pump/motor, means for determining a flow rate of the engine that would produce a target line pressure within a predetermined period, a flow rate at which a pressure in the accumulator is within an acceptable range of pressure; and means for summing the determined current flow rate of the pump/motor, the determined flow rate of the engine, and the determined a flow rate at which a pressure in the accumulator is within a predetermined range of pressure.

18. The system of claim 12 wherein said engine operating parameter is one of an engine output torque, an engine airflow, a throttle position of the engine, an ignition timing, and an engine air-fuel ratio.

* * * * *